G. LEWIS.
DYNAMO ELECTRIC GENERATOR.
APPLICATION FILED APR. 8, 1909.

948,817.

Patented Feb. 8, 1910.
2 SHEETS—SHEET 1.

WITNESSES:
David J. Walsh
Mo. E. Dow

INVENTOR
George Lewis
BY Clark Deemer
ATTORNEYS

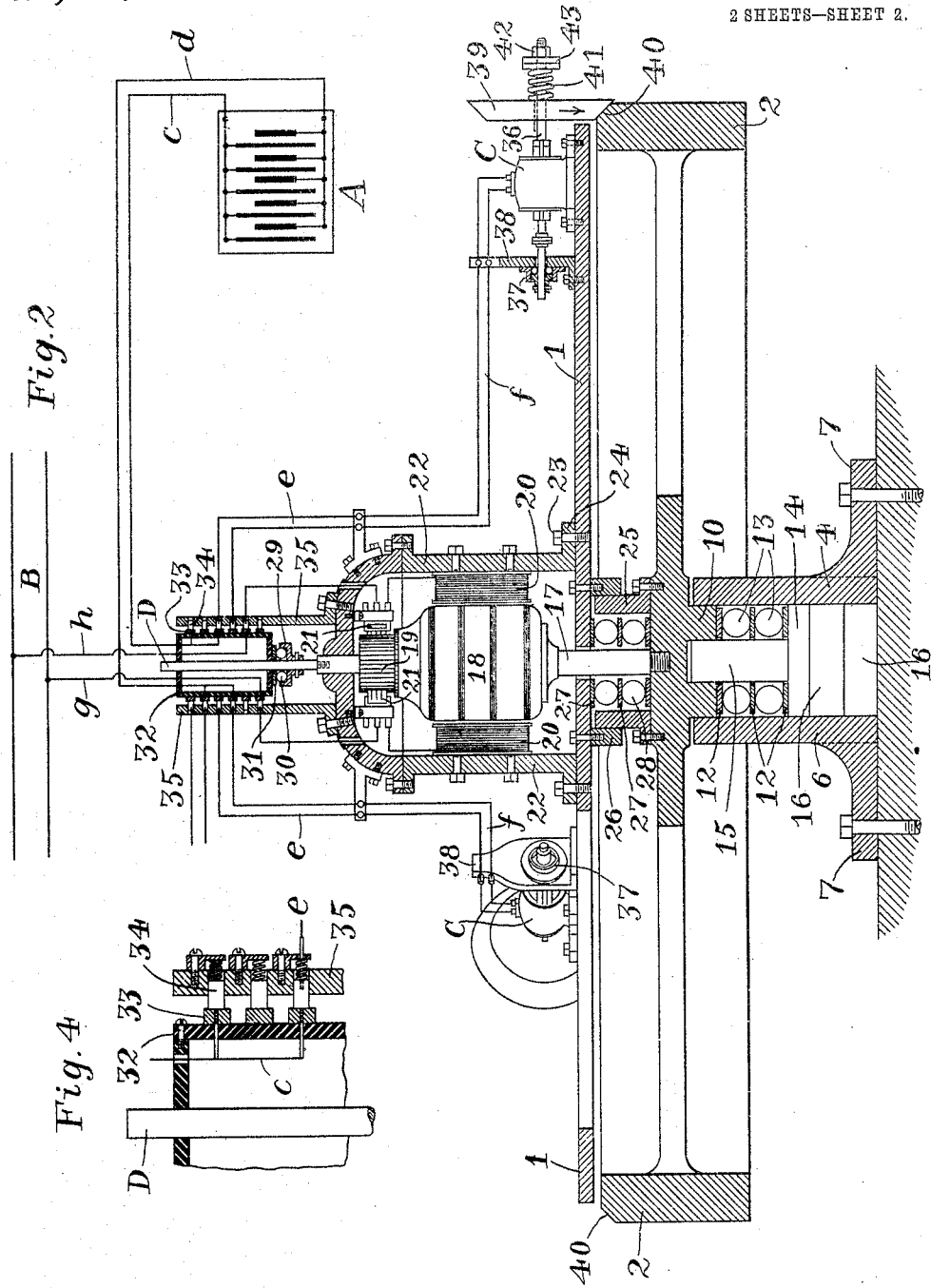

UNITED STATES PATENT OFFICE.

GEORGE LEWIS, OF NEWARK, NEW JERSEY.

DYNAMO-ELECTRIC GENERATOR.

948,817.  Specification of Letters Patent.  Patented Feb. 8, 1910.

Application filed April 8, 1909. Serial No. 488,611.

*To all whom it may concern:*

Be it known that I, GEORGE LEWIS, a citizen of the United States, and resident of Newark, county of Essex, and State of New Jersey, have invented certain new and useful Improvements in Dynamo-Electric Generators, of which the following is a specification, reference being had to the accompanying drawing, forming a part thereof, in which similar characters of reference indicate corresponding parts.

This invention relates to dynamo-electric generators; the objects of the invention being to provide a novel structure of this character comprising a plurality of parts so constructed and assembled as to increase the lines of force cut, practically eliminate armature reaction and produce high speed and a maximum of power, the speed being automatically governed, a further object being to reduce friction and provide for perfect lubrication of the bearing parts.

The invention will be hereinafter fully described and specifically set forth in the annexed claims.

Figure 1:
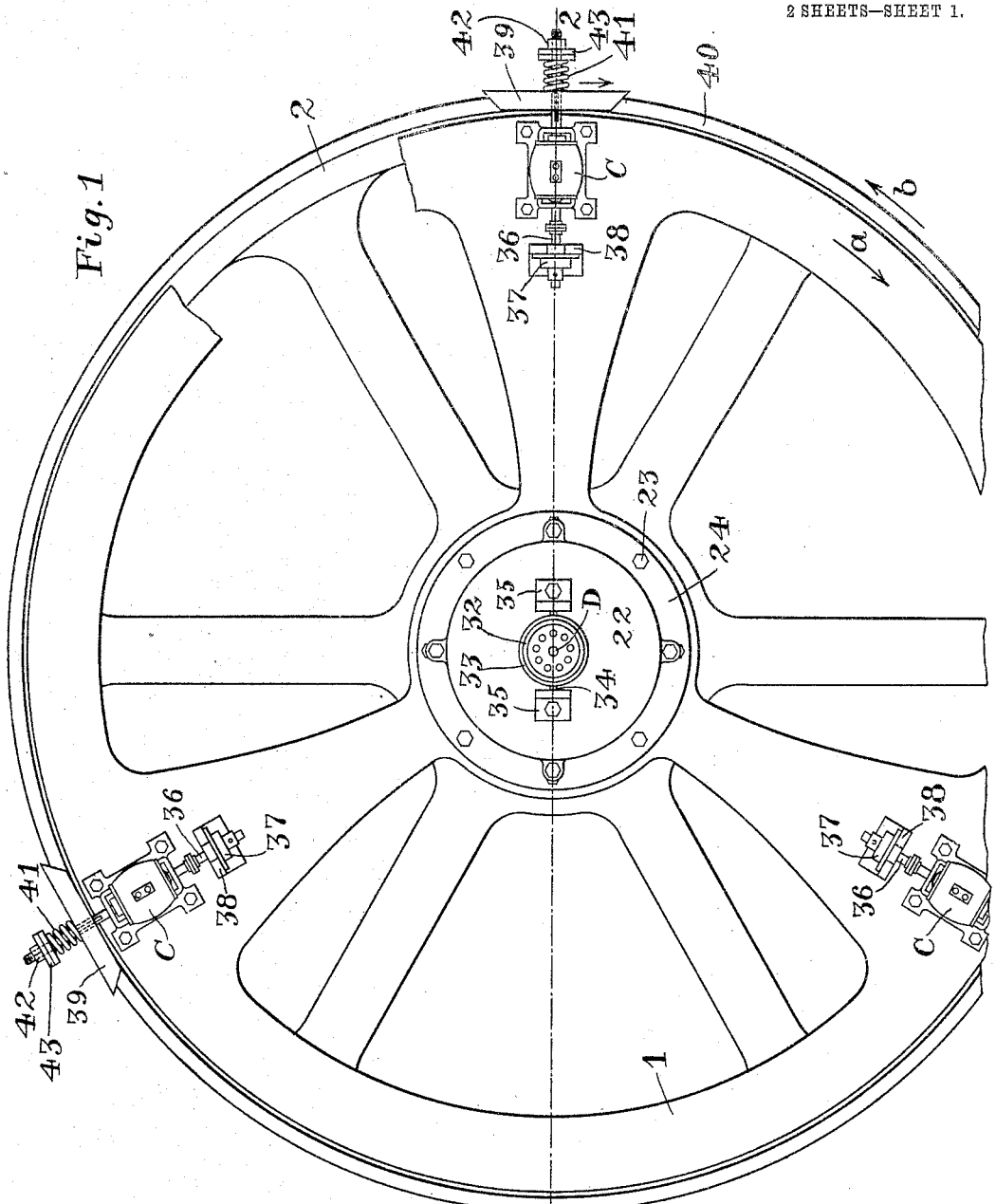
Figure 3:
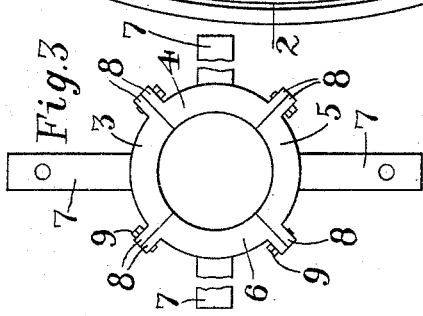

In the accompanying drawings forming part of this specification, Figure 1, is a plan view of my improved generator; Fig. 2, a cross sectional elevation taken on the line 2—2, of Fig. 1; Fig. 3, a plan view of the base for supporting the device; and Fig. 4, a vertical sectional elevation of a part of the device, drawn on an enlarged scale.

In the example of my invention illustrated by the drawings 1, is a revoluble table and 2, is a revoluble fly wheel; the table 1, adapted to revolve in the direction of the arrow *a*, and the fly wheel 2, in an opposite direction, shown by the arrow *b*. For supporting these said parts I provide an upright bearing or standard embodying the segmental sections 3, 4, 5 and 6, which each have an arm or base plate 7, extended therefrom, the same adapted to be bolted to a suitable bed; the sections each being provided with flanges 8, at their abutting edges, and these are connected by means of suitable bolts 9.

An annular flange 10, is extended downwardly and centrally from the hub of the fly wheel 2, and this said flange bears upon ball bearings comprising the rings 12, and spheres 13, the same supported upon the base 14, of a spindle 15, which is journaled into the hub of the fly-wheel 2; the base of the spindle 15, resting directly upon a foundation comprising a plurality of removable circular blocks 16. By the use of the sectional foundation above described it is obvious that the bearings may be readily and perfectly lubricated without the necessity of disturbing or disassembling any of the supported parts comprising the working structure.

Extended upwardly from and rigidly secured to the hub of the fly wheel 2, is a shaft 17, which carries an armature 18, and a commutator 19. Surrounding the armature 18, are field coils 20, which are in electrical connection with the brushes 21, the same bearing on the commutator 19; the said coils and brushes being secured to a metallic casing 22, which said casing is fastened to the table 1, by means of the bolts 23, which extend through a flange 24, formed integral with said casing, and are threaded into the said table, whereby the field coils and brushes revolve around the armature when the table is given revoluble motion, the armature revolving in an opposite direction, as will be hereinafter more fully described.

Secured to the upper surface of the hub of the fly wheel 2, is a circular box 25, which is surrounded by a ring 26, which depends centrally from and is secured to the table 1. Within the said box 25, is a ball bearing for directly supporting the table 1, said bearing comprising the rings 27 and spheres 28.

Upon the extension D, of the shaft 17, is a circular box 29, carrying a ball bearing 30, which bears directly upon a ring 31, located beneath a stationary cylinder 32. The said cylinder 32 has peripherally arranged thereon a plurality of copper rings 33, these rings contact with brushes 34, which are carried by uprights 35, said uprights extended upwardly from and secured to the casing 22, which carries the magnetic field, whereby said brushes revolve around the said copper rings when revoluble movement is imparted to the said field.

Upon the table 1, near the periphery thereof is secured a plurality of electric motors C; the armature shafts 36, of said motors revolve in ball bearings 37, which are mounted upon uprights 38, said uprights being secured to and extended upwardly from the table 1. Slidably keyed upon each shaft 36, is a beveled driving wheel 39, which is maintained normally in frictional contact with the beveled edge 40, of the fly wheel 2, by means of a spiral spring 41, the tension of the same being governed by a locking nut 42, which bears upon a washer 43, said spring being held between the outer face of the bevel wheel and said washer.

Wire conductors $c$ and $d$, lead from a source of electrical supply as a storage battery A. These conductors are in electrical connection by means of the copper rings 33, the brushes 34, and conductors $e$ and $f$, with the motors 35. The field coils 20, are in electrical connection through the medium of suitable wires and the brushes 21 and 34, with the conductors $g$ and $h$, which lead to feed wires B. Thus a current of electricity may be conducted from the generator to supply electric lamps or other devices.

In the operation of my invention the storage battery A, supplies the power for operating the motors 35, thus imparting revoluble movement to the driving wheels 39, and thence to the fly wheel 2. The said fly wheel and its connected armature 18, revolve around a vertical axis in one direction and the table 1, field coils 20 and brushes 21, revolve around the same axis, but in an opposite direction, and a current of electricity is generated.

By use of this invention high speed and power may be obtained, and owing to the slidable and spring-pressed arrangement of the driving wheels 39, the speed is automatically governed by centrifugal force acting upon the driving wheels to throw them out of frictional contact with the fly wheel when too high speed is attained.

Having thus described my invention, what I claim as new and desire to secure by Letters Patent, is:—

1. A dynamo-electric generator comprising a revoluble table carrying an inclosed field magnet and a plurality of motors having each a spring-pressed driving wheel, and an armature and commutator, and a fly wheel secured to the shaft of said armature, the said driving wheels peripherally engaging the said fly wheel, substantially as shown and described.

2. In a dynamo-electric generator, the combination, with a revoluble table having a centrally located field magnet and a casing, and a plurality of electric motors each having a driving wheel, of a revoluble fly wheel engaging said driving wheels and having an armature and commutator, the said table and fly wheel revoluble around a vertical axis and in opposite directions, substantially as shown and described.

3. In a dynamo-electric generator, the combination, with a revoluble table having a field magnet and a casing therefor and commutator brushes, and a plurality of electric motors on said table each having a friction driving wheel, of a fly wheel in peripheral engagement with the said driving wheels, the table and fly wheel revolving in opposite directions, and said fly wheel having a vertical shaft and an attached armature and commutator, and means comprising a source of supply and a circuit for operating the motors, substantially as shown and described.

4. In a dynamo-electric generator, the combination, with a revoluble table having an incased field magnet and brushes and a plurality of radially arranged electric motors having each a spring pressed friction driving wheel, of a revoluble fly wheel in peripheral engagement with the said driving wheels, and an armature and commutator extended upwardly from said fly wheel and located adjacent to the said field magnet, and a circuit and operating means, and antifriction bearings supporting the parts, substantially as shown and described.

5. In a dynamo-electric generator, the combination, with a revoluble table having a field magnet and brushes and a casing, and a plurality of radially arranged electric motors equidistant from each other and having each a spring pressed friction driving wheel, of a revoluble fly wheel in peripheral engagement with said driving wheels, and ball bearings between the said fly wheel and table, and an armature and commutator mounted on a shaft extended upwardly from said fly wheel, and a circuit and operating means, and a support comprising segmental sections, ball bearings and a spindle for directly supporting the apparatus, substantially as shown and described.

In testimony that, I claim the foregoing as my invention, I have signed my name in presence of two witnesses, this 27 day of March 1909.

GEORGE LEWIS.

Witnesses:
 ADOLPH MENDEL,
 M. S. DOW.